United States Patent
Fisher et al.

(10) Patent No.: US 10,766,089 B2
(45) Date of Patent: Sep. 8, 2020

(54) HEAT INPUT CONTROL FOR WELDING SYSTEMS

(75) Inventors: Kenneth Allen Fisher, Neenah, WI (US); James F. Ulrich, Appleton, WI (US); Ryan Jerome Lindeman, Neenah, WI (US)

(73) Assignee: Illinois Tool Works, Glenview, IL (US)

( * ) Notice: Subject to any disclaimer, the term of this patent is extended or adjusted under 35 U.S.C. 154(b) by 748 days.

(21) Appl. No.: 13/182,353

(22) Filed: Jul. 13, 2011

(65) Prior Publication Data

US 2012/0012559 A1   Jan. 19, 2012

Related U.S. Application Data

(60) Provisional application No. 61/364,257, filed on Jul. 14, 2010.

(51) Int. Cl.
*B23K 9/10* (2006.01)
*B23K 9/095* (2006.01)
*B23K 9/18* (2006.01)

(52) U.S. Cl.
CPC .......... *B23K 9/1062* (2013.01); *B23K 9/0953* (2013.01); *B23K 9/186* (2013.01)

(58) Field of Classification Search
CPC .... B23K 9/0953; B23K 9/1062; B23K 9/186; G02C 2202/16; G02C 7/02; G02C 7/12; H04N 2213/001; H04N 2213/008; G02B 27/26
USPC ....... 219/73.1–73.21, 130.1–130.51, 121.34, 219/121.54
See application file for complete search history.

(56) References Cited

U.S. PATENT DOCUMENTS

| | | | |
|---|---|---|---|
| 4,375,026 A | 2/1983 | Kearney | |
| 4,482,798 A * | 11/1984 | Hurlebaus | B23K 9/0734 219/137.71 |
| 4,551,668 A | 11/1985 | Kammiller | |
| 4,825,038 A | 4/1989 | Smartt et al. | |

(Continued)

FOREIGN PATENT DOCUMENTS

| CN | 1101597 | 4/1995 |
|---|---|---|
| CN | 1871093 | 11/2006 |

(Continued)

OTHER PUBLICATIONS

International Search Report for application No. PCT/US2011/044054 dated Oct. 18, 2011.

(Continued)

*Primary Examiner* — Tu B Hoang
*Assistant Examiner* — Diallo I Duniver
(74) *Attorney, Agent, or Firm* — McAndrews, Held & Malloy, Ltd.

(57) ABSTRACT

A heat input control method for a welding system includes the step of receiving data encoding a desired heat input range having heat input values included between an upper limit and a lower limit. The method also includes the step of receiving data encoding a desired change to a level of a first weld variable of a set of weld variables. Further, the method includes determining a change to a level of a second weld variable of the set of weld variables. The determined change to the level of the second weld variable is suitable to maintain a heat input of a welding operation within the desired heat input range.

7 Claims, 3 Drawing Sheets

(56) References Cited

U.S. PATENT DOCUMENTS

| | | |
|---|---|---|
| 5,043,557 A | 8/1991 | Tabata |
| 6,066,832 A | 5/2000 | Uecker |
| 6,087,626 A | 7/2000 | Hutchison |
| 6,315,186 B1 | 11/2001 | Friedl |
| 6,359,258 B1 | 3/2002 | Blankenship |
| 6,399,912 B1* | 6/2002 | Steenis ............... B23K 9/186 219/73.2 |
| 6,476,354 B1 | 11/2002 | Jank |
| 6,479,793 B1 | 11/2002 | Wittmann |
| 6,596,970 B2 | 7/2003 | Blankenship |
| 6,703,585 B2 | 3/2004 | Suzuki |
| 6,730,875 B2 | 5/2004 | Hsu |
| 6,933,446 B1 | 8/2005 | Waldorf |
| 7,091,445 B2 | 8/2006 | Myers |
| 7,208,697 B2 | 4/2007 | Blankenship |
| 7,217,904 B2 | 5/2007 | Blankenship |
| 7,304,268 B2 | 12/2007 | Burt |
| 2002/0079301 A1* | 6/2002 | Bong et al. ............... 219/130.5 |
| 2003/0071024 A1* | 4/2003 | Hsu ............... B23K 9/0956 219/130.01 |
| 2003/0121956 A1* | 7/2003 | Offer ............... B23K 9/232 228/214 |
| 2005/0133488 A1* | 6/2005 | Blankenship ............ B23K 9/02 219/130.01 |
| 2007/0262064 A1 | 11/2007 | Daniel |
| 2007/0262065 A1* | 11/2007 | Peters ............... B23K 9/32 219/130.5 |
| 2010/0065539 A1 | 3/2010 | Daniel |
| 2010/0133250 A1 | 6/2010 | Sardy |

FOREIGN PATENT DOCUMENTS

| | | |
|---|---|---|
| EP | 0165501 | 12/1985 |
| EP | 0865858 | 9/1998 |
| GB | 2220534 | 1/1990 |
| JP | H01241382 | 9/1989 |
| JP | 550240 | 2/1993 |
| RU | 2077415 | 4/1997 |

OTHER PUBLICATIONS

"Quality seams thanks to Synchroweld: Robot-supported welding of exhaust systems," Automation & Qualitat Welding Robots, Feb. 2008.

"Synchroweld—perfect interaction of robot and welding system," Motoman News, Issue Feb. 2007, pp. 12-13.

"Use of the Synchroweld Function: Technical Information," SKS Welding Systems, Automation & Qualitat Welding Robots, Mar. 3, 2008.

Editorial, "Schweisstechnick Soudure," Jun. 25, 2007, pp. 1-7.

Technical Magazine, "Welding and Cutting," Schweissen & Schneiden, May 2007, pp. 1-5, 56.

Thomsen, Jesper Sandberg, "Advanced Control Methods for Optimization of Arc Welding," Ph.D. Thesis, Department of Control Engineering, Aalborg University, May 31, 2005.

European Patent Office, Opposition to EP 2 593 264 B1, Ol-Lorch Schweisstechnik GmbH, Jun. 1, 2016.

European Patent Office, Opposition to EP 2 593 264 B1, SKS Welding Systems GmbH, Jun. 2, 2016.

Joseph, Andrew Paul, "Assessing the Effects of GMAW-Pulse Parameters on Arc Power and Weld Heat Input," Thesis, Ohio State University, 2001.

* cited by examiner

HEAT INPUT CONTROL FOR WELDING SYSTEMS

CROSS REFERENCE TO RELATED APPLICATIONS

This application is a Non-Provisional Patent Application of U.S. Provisional Patent Application No. 61/364,257 entitled "Control of Subarc Weld System", filed Jul. 14, 2010, which is herein incorporated by reference.

BACKGROUND

The invention relates generally to welding systems and, more particularly, to heat input control systems and methods for welding systems.

Welding is a process that has become ubiquitous in various industries for a variety of types of applications. For example, welding is often performed in applications such as shipbuilding, industrial construction and repair, and so forth. During such welding processes, a variety of control devices are often provided to enable an operator to control one or more parameters of the welding operation. For example, foot and hand activated controls capable of functioning as user interfaces may be provided to enable the operator to alter the amperage, voltage, or any other desirable parameter of the welding process. Traditionally, when an operator is attempting to optimize features of the weld, the operator alters one or more weld variables through a suitable interface and observes the effect on the weld. However, oftentimes, these weld variable changes may result in a change in the amount of heat delivered to the weld per distance travelled, thus affecting mechanical properties of the weld that may not be readily identifiable to the welding operator. Accordingly, there exists a need for improved welding systems that overcome this drawback.

BRIEF DESCRIPTION

As described below, a welding system includes a welding power source having power conversion circuitry adapted to generate a welding power output for use in a welding operation. The welding power source is adapted to receive a desired heat input level for the welding operation and a desired change to a weld variable level. The welding system also includes control circuitry communicatively coupled to the welding power source and adapted to receive data encoding the desired heat input level and the desired change to the weld variable level, to determine a second weld variable level suitable to substantially maintain the desired heat input level, and to generate a control signal to command the welding power source to implement the determined second weld variable level.

As also described, a method includes receiving data encoding a desired heat input range comprising heat input values included between an upper limit and a lower limit and receiving data encoding a desired change to a level of a first weld variable of a set of weld variables. The method also includes determining a change to a level of a second weld variable of the set of weld variables. The determined change to the level of the second weld variable is suitable to maintain a heat input of a welding operation within the desired heat input range.

As further described, a welding system includes a welding power supply comprising power conversion circuitry adapted to generate a welding power output for use in a welding operation and an operator interface adapted to receive a desired heat input level and an operator initiated adjustment to a weld variable of a set of weld variables. The welding system also includes a wire feeder coupled to the welding power supply and adapted to apply the welding power output to a supplied welding wire. The welding system further includes a positioning system adapted to position a welding torch and a workpiece with respect to one another. The embodiment also includes control circuitry adapted to receive data encoding the desired heat input level and the adjustment to the weld variable, to determine a change to a level of a second weld variable of the set of weld variables that is suitable to maintain a heat input of the welding operation approximately equal to the desired heat input level, and to generate a control signal encoding the determined change to the second weld variable. The generated control signal is communicated to the welding power supply, the wire feeder, the positioning system, or a combination thereof for implementation in the welding operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, described herein are embodiments of welding systems capable of controlling the heat input into a weld as a welding operation is performed on a workpiece. This feature may be advantageous in automatic or semi-automatic welding systems (e.g., submerged arc welding systems where the welding zone is shielded by granular flux), in which the level of a variety of weld variables may be altered throughout the welding operation. In these systems, when a first weld variable level is altered, for example, via a manual or automatically generated command, provided embodiments may alter another weld variable to maintain the heat input per distance travelled at a desired level or within a preset range of values. To that end, certain embodiments of the disclosed welding systems may generate control signals that encode an alteration in weld variables such as voltage, current, wire feed speed, and/or travel speed, among other variables. These control signals may be communicated to devices, such as a welding power supply, a wire feeder, and/or a positioning system, within the welding system such that the heat input into the weld is regulated.

Figure 1:
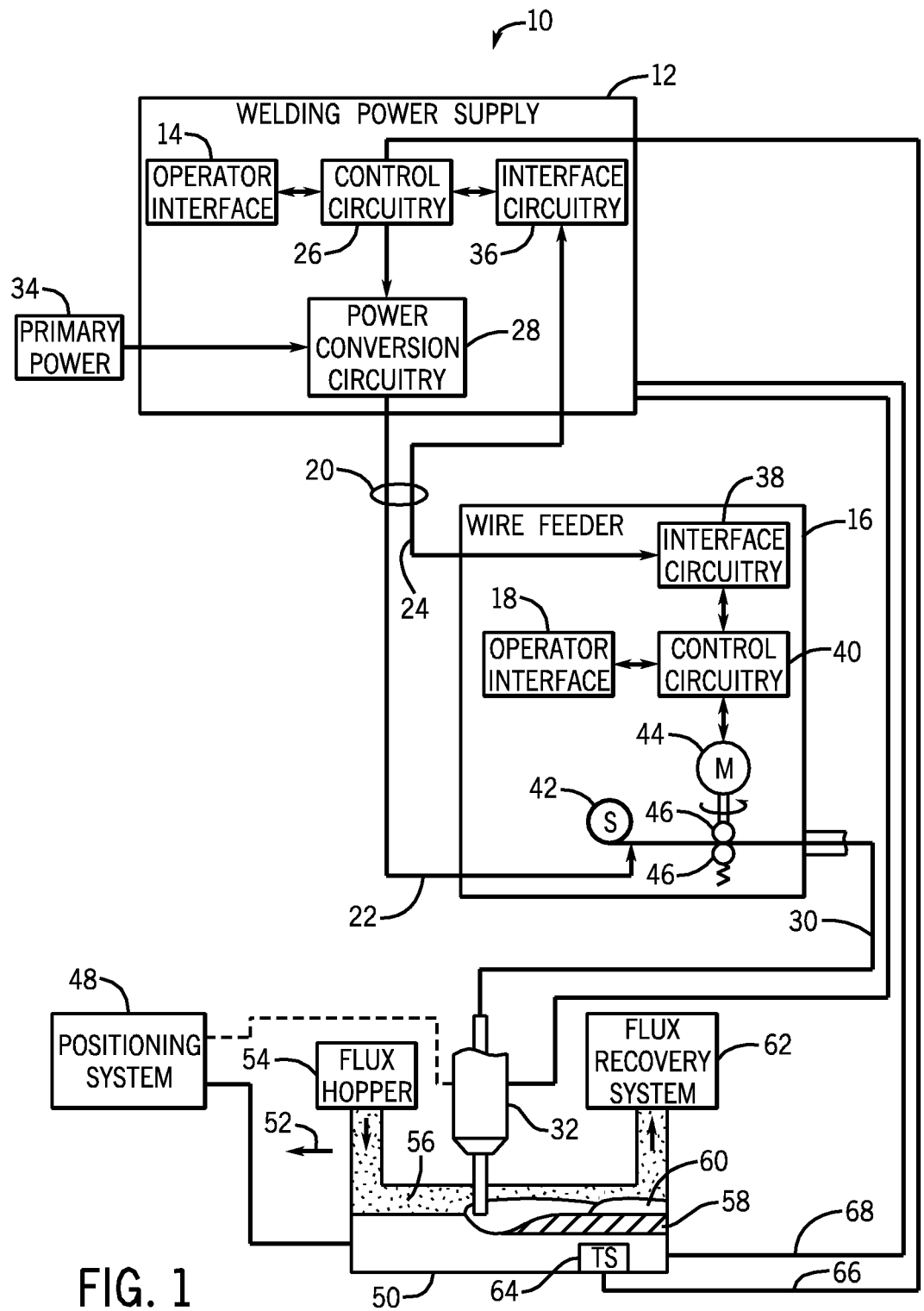
FIG. 1 illustrates functional components of an exemplary submerged arc welding system having heat input control capabilities in accordance with an embodiment of the present invention.

Turning now to the drawings, FIG. 1 illustrates an exemplary submerged arc welding system 10 that powers, controls, and provides supplies to a welding operation. However, it should be noted that although the embodiments described herein are shown in the context of a submerged arc system, these embodiments are compatible with other types of welding systems as well. For example, the presently disclosed heat input regulation control may be used with any wire feeding process, such as gas operations (gas metal arc welding (GMAW)) or gasless operations (shielded metal arc welding (SMAW)), or any welding operation that does not include a wire feed. For further example, presently disclosed embodiments may be employed in metal inert gas (MIG) welding, tungsten inert gas (TIG) welding, or stick welding.

The welding system 10 includes a welding power supply 12 that includes an operator interface 14. In manual or semi-automatic operations, the operator interface 14 may include a control panel that enables a welding operator to control the supply of welding materials, such as gas flow, wire feed, and so forth, to a welding torch. To that end, in some embodiments, the operator interface 14 may include input or interface devices, such as knobs or switches, which the operator may use to adjust welding parameters (e.g., voltage, current, etc.). Weld variables that guide operation of the welding power supply 12 may include voltage, current, wire feed speed, and travel speed. For example, voltage may be automatically or manually altered to control the shape and appearance of the weld bead cross section. Similarly, amperage and wire feed speed may be adjusted to control weld bead penetration depth, base metal dilution, and so forth. Likewise, travel speed may be automatically or manually adjusted to control wed bead penetration and size. Further, these or other weld variables may be adjusted throughout the weld operation to maintain the heat input per distance travelled at a desired level or within a desired range, as discussed in more detail below. Still further, it should be noted that the heat input per distance travelled may be calculated in the presently disclosed methods via any suitable method known to those skilled in the art. For example, heat input per distance travelled may be calculated by integrating the product of voltage and current and dividing by travel speed.

As illustrated, the welding system 10 also includes a wire feeder 16 that provides welding wire to the welding torch for use in the welding operation. In some embodiments, the wire feeder 16 may also include an operator interface 18 that enables the user to set one or more wire feed parameters, such as wire feed speed. In other embodiments, however, the operator interface 18 may be omitted, and the user may input such parameters via the operator interface 14 in the welding power supply 12. In the illustrated embodiment, a bundle of cables 20 couples the welding power supply 12 to the wire feeder 16 and provides weld materials for use in the welding operation. The bundle 20 includes a power cable 22 and a control cable 24. It should be noted that the bundle 20 of cables may not be bundled together in some embodiments.

Additional internal components of the welding power supply 12 and the wire feeder 16 are also illustrated in FIG. 1. Once the illustrated operator interface 14 receives a selection of settings, such as the desired heat input level or range, these weld settings are communicated to control circuitry 26 within the welding power supply 12. The control circuitry 26 operates to control generation of the welding power output that is applied to the welding wire for carrying out the desired welding operation. To that end, the control circuitry 26 is coupled to power conversion circuitry 28. The power conversion circuitry 28 is adapted to create the output power that will ultimately be applied to a welding wire 30 at a contact tube 32. Various power conversion circuits may be employed, including choppers, boost circuitry, buck circuitry, inverters, converters, and so forth. The configuration of such circuitry may be of types generally known in the art. The power conversion circuitry 28 is coupled to a source of electrical power 34 originating, for example, in the power grid, although other sources of power may also be used, such as power generated by an engine-driven generator, batteries, fuel cells or other alternative sources.

In some embodiments, the control circuitry 26 is configured to receive data encoding a desired heat input level or range, which may be specified, for example, by an operator via the operator interface 14. Further, the control circuitry 26 may also receive data encoding a desired alteration to a level of a weld variable, such as weld voltage or current. Once the desired change is received, the control circuitry may calculate an anticipated change to the heat input based on the desired alteration. Further, the control circuitry may then determine a suitable alteration to another weld variable that will maintain the heat input at the desired level or in the desired range when the desired change is implemented. For example, in one embodiment, the desired heat input per distance travelled may be approximately 25 kJ/cm, and the desired change indicated by the operator may be an increase in current during a reworking of a weld joint, which may be desired, for example, to achieve a desired fill rate. In this instance, the control circuitry 26 may determine the effect of the indicated current change on the heat input and may adjust travel speed to compensate for this effect to maintain the heat input at the desired level. The foregoing feature is described in more detail below with respect to FIGS. 2 and 3.

Finally, the welding power supply 12 illustrated in FIG. 1 also includes interface circuitry 36 configured to enable the control circuitry 26 to exchange signals with the wire feeder 16. The wire feeder 16 also includes interface circuitry 38 that is coupled to the interface circuitry 36 in the power supply 12 via data cable 24. In some embodiments, multi-pin interfaces may be provided on both components and a multi-conductor cable run between the interface circuitry to allow for such information as wire feed speeds, processes, selected currents, voltages or power levels, and so forth to be set on either the power supply 12, the wire feeder 16, or both.

The wire feeder 12 also includes control circuitry 40 coupled to the interface circuitry 38. The control circuitry 40 enables wire feed speeds to be controlled in accordance with operator selections, and permits these settings to be fed back to the power supply 12 via the interface circuitry 38. The control circuitry 40 is further coupled to the operator interface 18 on the wire feeder 16 that allows selection of one or more welding parameters, particularly wire feed speed. Again, in certain embodiments, the operator interface 18 may also allow for selection of such weld parameters as the process, the type of wire utilized, current, voltage or power settings, and so forth. Additionally, it should be noted that control circuitry 40 may, in some embodiments, be configured to regulate the heat input for a welding operation in conjunction with or independent from the control circuitry 26 in the welding power supply 12. Still further, it should be noted that the control circuitry capable of regulating the heat input for the welding operation may be located in the welding power supply 12, the wire feeder 16, or in any other desired location. For example, in certain embodiments, the control circuitry may be located in a standalone unit, or may be integrated into other system components, such as positioning system 48. Indeed, the location of the control circuitry 26 in the welding power source 12 is not meant to limit the location of the control circuitry to this position.

The wire feeder 16 also includes components for feeding wire to the contact tube 32 and thereby to the welding application, under the control of control circuitry 40. For example, one or more spools 42 of welding wire 30 are housed in the wire feeder 16. Welding wire 30 is unspooled from the spools 42 and is progressively fed to the contact tube 32. A feed motor 44 is provided that engages with feed rollers 46 to push wire from the wire feeder towards the contact tube 32. In practice, one of the rollers 46 is mechanically coupled to the motor 44 and is rotated by the motor to drive the wire from the wire feeder, while the mating roller is biased towards the wire to maintain good contact between the two rollers and the wire. Some systems may include multiple rollers of this type.

Power from the power supply 12 is applied to the wire 30, typically by means of the welding cable 22, in a conventional manner. Similarly, in gas welding embodiments, shielding gas may be fed through the wire feeder and the welding cable. During welding operations, the wire is advanced through the welding cable jacket towards the contact tube 32. Within the contact tube, an additional pull motor may be provided with an associated drive roller and regulated to provide the desired wire feed speed. As the welding wire is advanced toward the contact tube 32, a positioning system 48 moves the contact tube 32 or the workpiece 50 to position the contact tube 32 with respect to the workpiece 50 throughout the welding operation. For example, in the illustrated embodiment, as the welding operation progresses, the positioning system moves the contact tube 32 in the direction of arrow 52.

A flux hopper 54 provides a granular flux layer 56 over the workpiece 50. A solidified weld material 58 and a solidified flux 60 are formed as the contact tube 32 is moved in direction 52. A flux recovery system 62 recovers the unfused flux for reuse at a later time in the welding operation. Additionally, in the illustrated embodiment, a temperature sensor 64 monitors the temperature of the workpiece 50 and communicates the measured value to the control circuitry 26 via cable 66. Further, a work connection 68 couples the workpiece 50 to the welding power supply 12 to complete the circuit between the power supply 12, the contact tube 32, and the workpiece 50.

Figure 2:
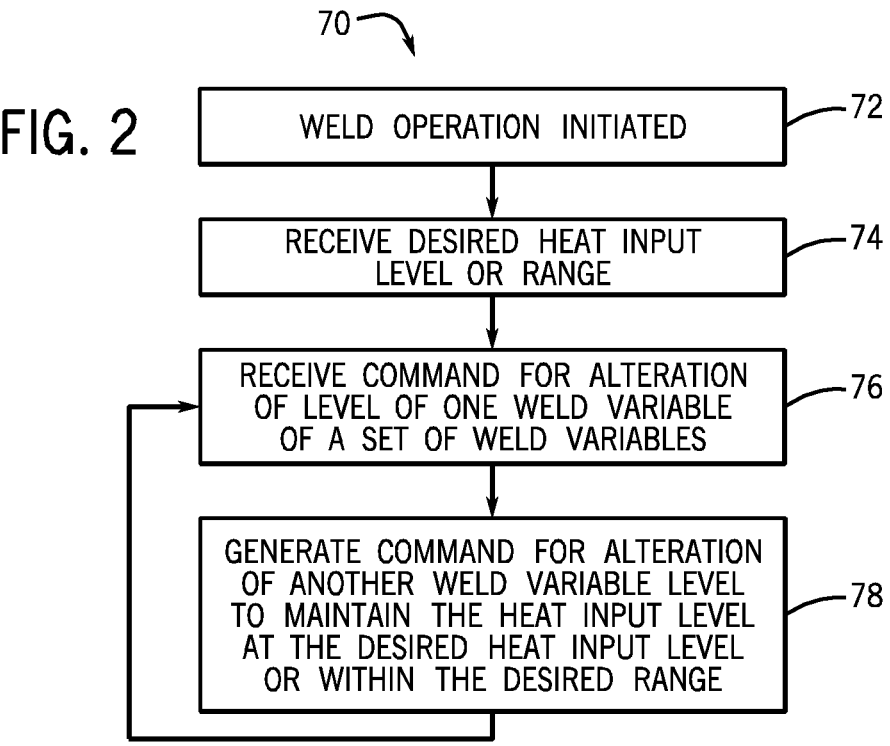
FIG. 2 is a flow chart illustrating an exemplary method that may be implemented to regulate heat input for a welding operation in accordance with an embodiment.

FIG. 2 illustrates an embodiment of a method 70 that may be implemented by the control circuitry 26 or 40 located in the power supply 12 or the wire feeder 16, respectively, to regulate the heat input per distance travelled during the welding operation. The method 70 includes initiation of the weld operation (block 72), for example, when the welding system is activated. The method 70 also includes receiving a desired heat input level or range (block 74). For example, the operator may specific a desired heat input value or a desired heat input value having an tolerance.

Still further, the method 70 includes receiving a command for an alteration to a level of a weld variable included within a set of possible weld variables (block 76). For example, the set of weld variables may include a welding voltage, a welding current, a wire feed speed, a travel speed, or some combination thereof, and the command may relate to a change desired in any one of those variables. Once the desired change is received, a control signal may be generated that calls for an alteration to another weld variable in the set of weld variables suitable for offsetting the anticipated change in the heat input associated with the desired change in the first weld variable (block 78). This step may be repeated any number of times throughout the welding operation as the weld variables are automatically or manually adjusted.

Figure 3:
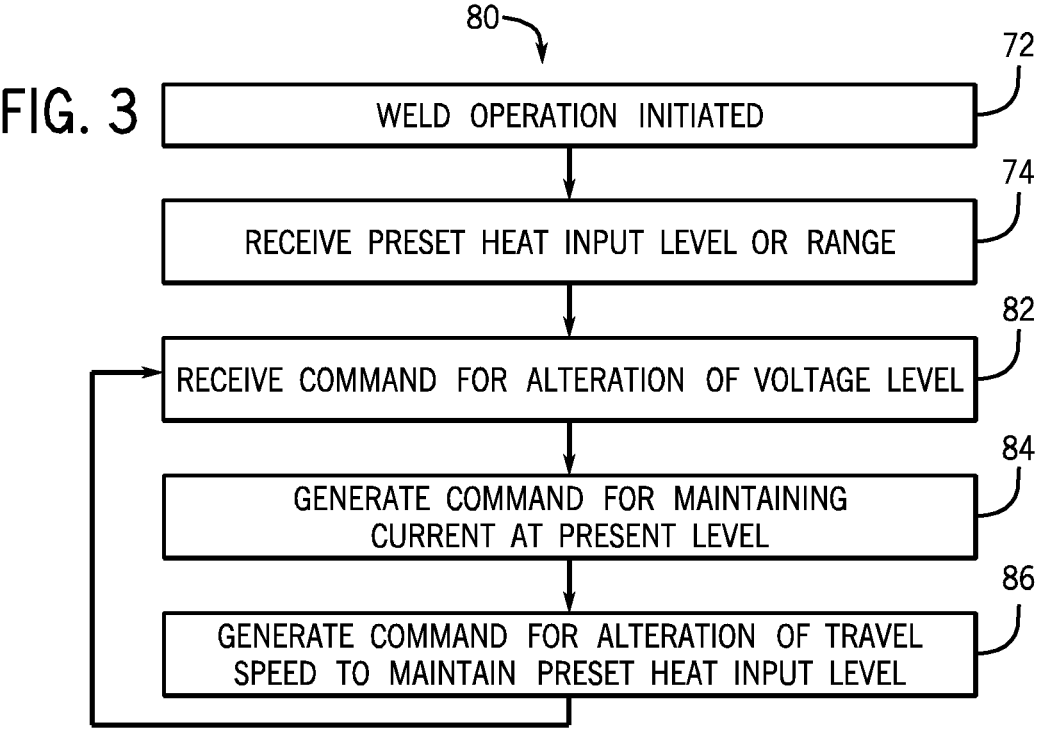
FIG. 3 is a flow chart illustrating an embodiment of the method of FIG. 2 that may be implemented to regulate heat input for a constant current welding operation.

FIG. 3 illustrates a method 80 that is an embodiment of the method 70 of FIG. 2. In this embodiment, for example, a constant current mode of operation is employed by the controller. Accordingly, once the weld operation is initiated (block 72) and the desired heat input level or range is specified (block 74), a command is received, for example, from an operator via an operator interface, for a desired change to the weld voltage level (block 82). Since the controller is in a constant current mode of operation, a command is generated for maintaining the weld current at the preset level (block 84). However, to compensate for the anticipated change in the heat input corresponding to the desired voltage level change, a command is generated for an alteration to travel speed (block 86). In this way, the heat input may be maintained at the desired level or within the desired range, and the current may be maintained at a substantially constant level throughout the welding operation.

It should be noted that in other embodiments, a similar method of control may be implemented in a constant voltage mode of operation or a constant power mode of operation. For example, in a constant voltage embodiment, when an operator specifies a change to the current level, a command may be generated to maintain the voltage at the preset level. However, to compensate for the anticipated heat input change corresponding to the current level change, the travel speed may be adjusted. For further example, if the operator indicates a desired change in travel speed, the power level may be adjusted, for example, by adjusting one or both of voltage and current, to compensate for the anticipated heat input change. Still further, in multiple arc systems that include multiple welders, the voltage and/or current of one or more welders may be adjusted to compensate for the expected heat input change.

Figure 4:
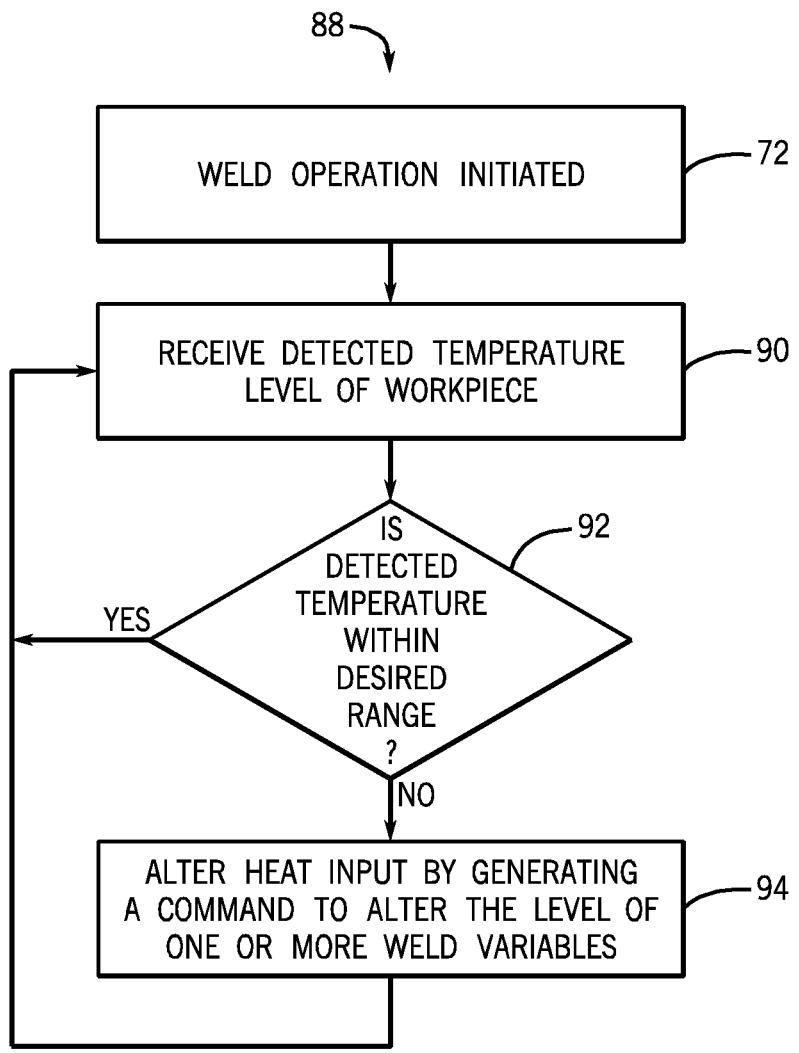
FIG. 4 is a flow chart illustrating an embodiment of a method that may be implemented to regulate a workpiece temperature during a welding operation.

FIG. 4 illustrates an embodiment of a method 88 that may be employed by a weld controller to regulate a temperature of the workpiece to a desired level or within a desired range. Once the weld operation is initiated (block 72), a detected temperature of the workpiece is received (block 90), and the detected temperature is compared to a preset desired range to determine whether the detected temperature is within the given tolerance (block 92). When the temperature is within the desired tolerance, the temperature is continuously or periodically monitored for any changes. However, when the temperature is not within the desired tolerance, the heat input per distance travelled may be altered via generation of a control signal that calls for a weld variable that influences heat input to be changed (block 94). That is, in this embodiment, one or more weld variables may be altered by a desired amount to regulate a heat input change, thereby affecting the workpiece temperature, until the detected temperature falls within the preset range.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a welding power source comprising power conversion circuitry configured to generate a welding power output for use in a welding operation, wherein the welding power source is configured to receive a desired heat input level for the welding operation and to receive a first adjustment to a voltage level via a user interface, and wherein the welding power source comprises a constant current supply or a constant voltage supply configured for use in a submerged arc welding operation; and control circuitry communicatively coupled to the welding power source and configured to:

receive data encoding the desired heat input level and the first adjustment to the voltage level;

during the welding operation, determine a second adjustment to a magnitude of a travel speed of a welding torch suitable to substantially maintain the desired heat input level in response to the first adjustment to the voltage level; and during the welding operation, generate a control signal to adjust the magnitude of the travel speed based on the desired heat input level during the welding operation to command the welding power source to implement the adjustment to the magnitude of the travel speed, wherein both the voltage level and the magnitude of the travel speed are adjusted by the control circuitry during the welding operation to maintain the desired heat input level.

2. The welding system of claim 1, wherein the control circuitry is configured to receive the desired heat input level in a range of suitable heat input values included within a preset tolerance.

3. The welding system of claim 1, comprising a flux hopper configured to supply flux to the welding operation and a flux recovery system configured to recover unfused flux from a workpiece.

4. A welding system comprising:

a welding power supply comprising power conversion circuitry configured to generate a welding power output for use in a submerged arc welding operation and an operator interface configured to receive a desired heat input level and an operator initiated first adjustment to a first weld variable of a set of weld variables, wherein the first weld variable is one of a voltage level or a wire feed speed and the welding power supply is operable in a constant current or constant voltage mode;

a wire feeder coupled to the welding power supply and configured to apply the welding power output to a supplied welding wire;

a positioning system configured to position a welding torch and a workpiece with respect to one another; and control circuitry configured to:

receive data encoding the desired heat input level and the first adjustment to the first weld variable;

during the submerged arc welding operation, determine a second adjustment to a second weld variable of the set of weld variables that is suitable to maintain a heat input of the submerged arc welding operation approximately equal to the desired heat input level in response to the first adjustment to the first weld variable, wherein the second weld variable is the other of the voltage level or the wire feed speed;

generate a control signal to adjust the second weld variable based on the desired heat input level during the submerged arc welding operation encoding the determined second adjustment to the second weld variable, and wherein both the first weld variable and the second weld variable are adjusted by the control circuitry during the submerged arc welding operation to maintain the desired heat input level.

5. The welding system of claim 4, comprising a flux hopper configured to supply flux to the welding operation and a flux recovery system configured to recover unfused flux from the workpiece.

6. The welding system of claim 4, wherein the control circuitry is configured to receive the desired heat input level in a range of suitable heat input values included within a preset tolerance.

7. The welding system of claim 4, wherein the wire feeder comprises a motor coupled to a set of drive rolls configured to unspool the supplied welding wire from a supply spool.

* * * * *